United States Patent [19]
Clermont et al.

[11] Patent Number: 5,828,729
[45] Date of Patent: Oct. 27, 1998

[54] AUTOMATED MASS CALLING DETECTION USING CCS7 MESSAGE PARAMETERS

[75] Inventors: Normand A. Clermont, St-Hubert; Maurice E. Lavigne, Kanata; Gerald W. Fikis, Nepean, all of Canada

[73] Assignee: Stentor Resource Centre Inc., Ottawa, Canada

[21] Appl. No.: 561,932

[22] Filed: Nov. 22, 1995

[51] Int. Cl.[6] .................................................. H04M 1/24
[52] U.S. Cl. ........................... 379/34; 379/133; 379/134; 379/230; 370/230; 370/237
[58] Field of Search .................... 379/1, 9–10, 15, 379/34, 207, 221, 229, 230, 113, 133–138; 370/230, 237

[56] References Cited

U.S. PATENT DOCUMENTS

| | | |
|---|---|---|
| 4,756,019 | 7/1988 | Szybicki . |
| 4,974,256 | 11/1990 | Cyr et al. . |
| 5,060,258 | 10/1991 | Turner . |
| 5,067,074 | 11/1991 | Farel et al. . |
| 5,068,892 | 11/1991 | Livanos . |
| 5,142,570 | 8/1992 | Chaudhary et al. . |
| 5,295,183 | 3/1994 | Langlois et al. . |
| 5,299,259 | 3/1994 | Otto . |
| 5,359,649 | 10/1994 | Rosu et al. . |
| 5,377,186 | 12/1994 | Wegner et al. ............................ 379/62 |
| 5,457,729 | 10/1995 | Hamann et al. ............................ 379/2 |
| 5,475,732 | 12/1995 | Pester, III ................................ 379/34 |
| 5,509,055 | 4/1996 | Ehrlich et al. .......................... 379/113 |
| 5,528,676 | 6/1996 | Sussell et al. .......................... 379/112 |
| 5,550,914 | 8/1996 | Clarke et al. ........................... 379/230 |
| 5,592,530 | 1/1997 | Brockman et al. ....................... 379/34 |

*Primary Examiner*—Curtis A. Kuntz
*Assistant Examiner*—Duc Nguyen
*Attorney, Agent, or Firm*—Cobrin & Gittes

[57] ABSTRACT

In a telephone network having a number of telephone switching offices which have CCS7 signalling capabilities and wherein each switching office is linked to STPs (Signalling Transfer Points), or other switching offices with CCS7 signalling links, a method of detecting mass calling events using CCS7 signalling data is disclosed. Each signalling link connecting a switch is monitored. For each call, an Initial Address Message sent from an originating switch to a terminating switch is identified. The IAM is then temporarily stored in storage means. When the occurrence of a release message indicative of an unsuccessful call attempt is detected, an identification of which of the stored IAMs corresponds to the release message is made. A count is computed for each directory (DN) having an IAM with a corresponding release message indicative of an unsuccessful call attempt such that mass calling events directed to a directory number can be detected.

17 Claims, 5 Drawing Sheets

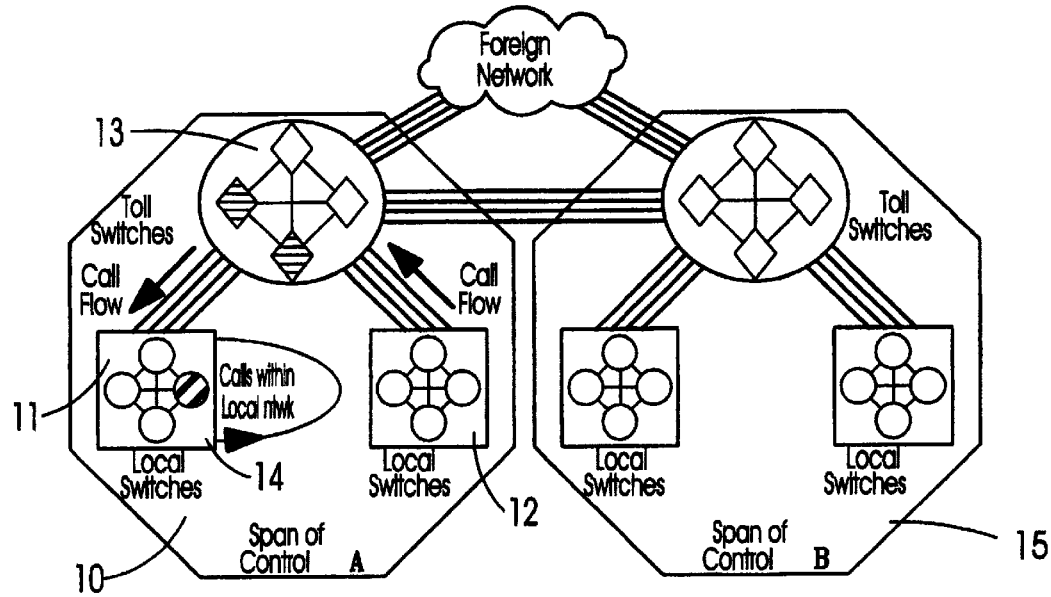
Fig. 1a
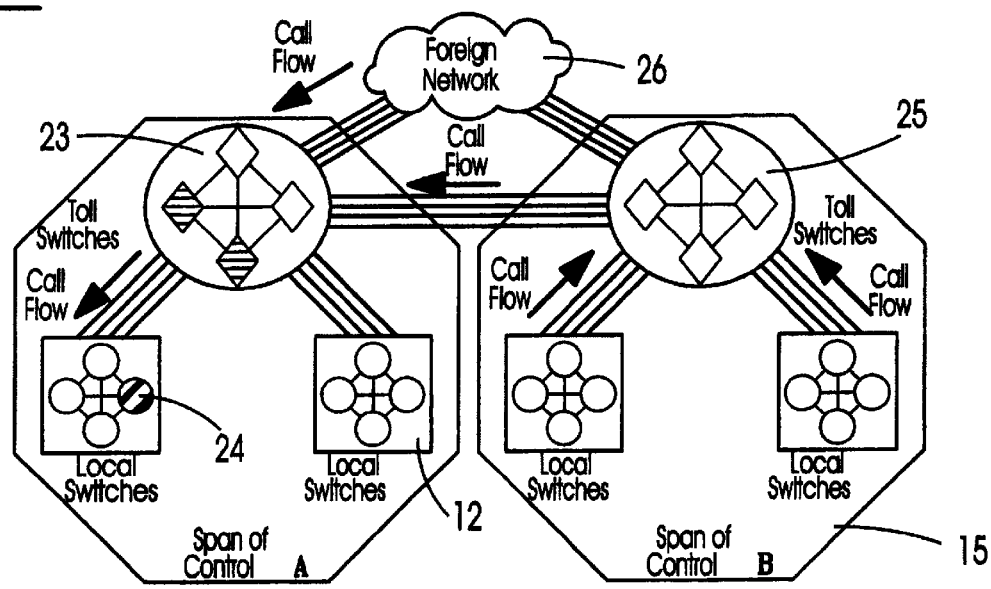
Fig. 1b
LEGEND–FIG. 1a to 1d
|  Toll Switches |  Local Switches |  Mass Called Switch |  Potential Congestion |  Call Flow |

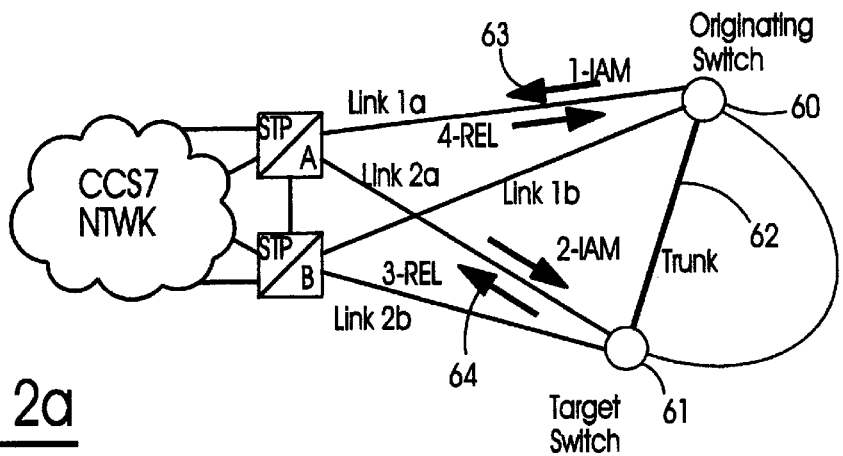
Fig. 2a
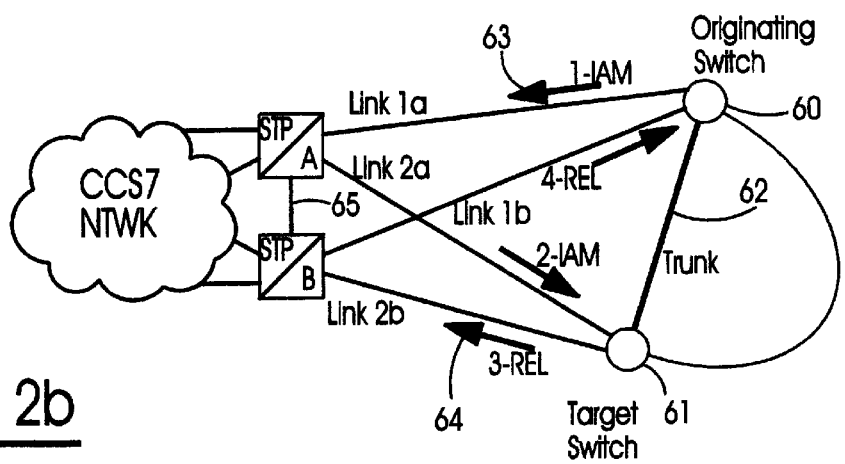
Fig. 2b
| INITIAL ADDRESS MESSAGES | | RELEASE MESSAGES | | COUNT |
|---|---|---|---|---|
| Called Number   CIC | OPC | CIC | DPC | |
| 613-555-1234   122 | 123-456-789 | 125 | 234-345-456 | |
| 613-555-1235   224 | 123-456-678 | 224 | 123-456-678 | 1 |
| | | | | |
| 800-555-NXXX   224 | 123-456-678 | 224 | 123-456-678 | 1 |
Fig. 2c

AUTOMATED MASS CALLING DETECTION USING CCS7 MESSAGE PARAMETERS

SUMMARY OF THE INVENTION

This invention relates to mass calling events in a telephone network wherein an abnormally large number of call attempts are directed to a limited number of lines, but more particularly, to an automated mass calling event detection method and system which makes use of CCS7 signalling data for the real time detection of mass calling events.

BACKGROUND OF THE INVENTION

Mass calling events are a day-to-day concern for network managers who attempt to predict and control them on a pro-active basis. Mass calling events are described as an abnormally large number of call attempts which are directed to a limited number of lines, with the result that the vast majority of these attempts are ineffective. This always results in the network having to process call attempts which cannot be successfully completed by the terminating switch as it recognizes the called (addressed) Directory Number(s) (DNs) as "busy". The result of such events may be switch performance degradation, network congestion and potential performance degradation for other services which require the capability of a Public Switched Telephone Network (PSTN). Currently, the resolution of contention for telephonic resources brought on by mass calling events is done via the use of already available network management controls manually evoked and offered in most digital switches today. Relatively often, some events occur without prior notice making the detection and control difficult. These problems have prompted the development of a method and system which would automatically detect abnormal conditions and apply appropriate network controls to resolve those conditions using the network resources supplied within an existing signalling infrastructure.

A variety of technology alternatives have been explored to address deficiencies inherent to known system detection approaches. Mass calling detection and control concepts have also been evolving in other organizations such as Bellcore.

For example, U.S. Pat. No. 5,295,183 entitled CONGESTION CONTROL SYSTEM FOR TELECOMMUNICATIONS, elaborates on a solution which relies on a dynamic traffic control system. More specifically, the patent describes a solution which is situated within the context of a network of switches connected to a central processor for periodically exchanging data to effect dynamic call routing, enhanced with congestion control mechanism.

In addition to duration and amplitude, the characteristics of mass calling also vary according to the nature of the origin and destination of the calls. Network managers are primarily interested in taking the necessary actions to prevent any event from impacting the performance of switches within their operational "jurisdiction". Also of concern, is the ability to take appropriate actions in the event that a group of switches have an impact on network elements outside of the network manager's area of operational responsibility: for example, when calling events take place in a competing exchange carrier affect the operation of the existing network. This would be the case, when clusters of local switches represent one local exchange carrier, while the cluster of toll switches forms part of an inter-exchange carrier network. The responsibility of carrying out network management of local switches is not centralized for all clusters and is spread across distinct operational groups.

Different types of mass calling events exist across a network and will be treated differently from the network manager's point of view. For example, network managers have the capability and authority to apply network management controls to switches within a defined span of control. The network managers are concerned with maintaining the health of all elements within their span of control, including switches and network. The network managers are also concerned about events which emanate from outside their operational area which may jeopardize the performance any of their network elements. They are also called upon to react in instances where events from their span of control affect other networks for which they have no direct operational control.

The three types of mass calling events which can impact the telephone network are as follows:

(1) Mass calling of Type I (Intra-network calls): are characterized by the fact that the vast majority of offending calls both originate and terminate within the sub network of interest, i.e. within the network manager's span of control.

(2) Mass calls of Type II (Outside Influence): pertains to a situation where a large number of offending calls destined to a target switch of interest within a network manager's span of control originate externally from the sub network of interest, i.e. for which the network manager does not have operational control, for example, calls originating through gateway switches such as toll switches.

(3) Mass calls of Type III (Outgoing Event): relate to massive numbers of calls originating from the network's manager span of control but which are destined to a target switch outside of the originating sub network. Here again, congestion at toll/gateway switches is possible.

(4) Number Translation Services: Irrespective of the source and target relationships as described above, mass calling events may be experienced on number translation-related services such as toll free (or "freephone") (800) or 900 calls, or any situation wherein a dialed number must be translated into a network routable number. For example, customers contributing to a Type I event may be dialing a 800 or 900 number. The design of a mass calling detection system has to take the services into account due to the translation which occurs prior to the called party being reached. Mass calling to a given DN (i.e. 613-555-1234) will require network management controls to be applied to the corresponding 800 or 900 number at the originating switches (i.e. 800-555-1234). Of particular interest are cases where mass calling is destined to a number for which translation is carried out by a competing carrier, therefore significantly challenging the design of the system.

(5) Sustained Mass Calling Event: Sustained mass calling events are characterized by their exceedingly long duration. Events such as day-long calling to auto clubs (e.g. during adverse weather conditions), federal tax credit help line or the selling of concert tickets are good examples.

(6) Short Duration Event: Examples of short duration events are mass calling to radio contests (for example the nth caller will receive a pair of tickets for . . . ), even televoting, etc.

(7) Focused Events: Literature on mass calling detection sometimes refers to focused events which are described as an abnormally large number of calls destined to a particular geographical area (as opposed to specific numbers). This would be experienced for example following some form of disaster in a given location (massive call flow toward the given area for the purpose of getting some news from friends, relatives, etc.).

Mass calling events may lead to network degradation translating into one or a combination of impacts on the network.

Switches (these being the terminating switches or occasionally tandem or toll switches) which are called upon to process high volumes of ineffective calls will see their CPU occupancy rate reach very high levels, which may lead to full failure or more generally, a poor performance level for calls within the switch. In some cases, mass calling has also translated in failure of automatic call distribution systems (ACDs). High CPU occupancy, the most common result of mass calling, is most often seen by the dialing public as "no dial-tone" or an inability to connect through.

As opposed to the more common negative impacts which affect terminating switches, dial tone delay is characterized by the fact that it is experienced at originating switches. This type of negative impact has occurred for events of significant magnitude and is due to the excessive number of customers who simultaneously pick up the phone (off-hook condition) to place their call. Dial tone resources within the switch become insufficient to serve the load and customers could wait many seconds before a call can be placed. The condition also prevails for callers who wish to place calls to destinations other than the mass called directory number. Dial tone delay is therefore another important consequence of mass calling events.

The magnitude of a mass calling event may result in the trunks to the destination switch becoming saturated. Trunk congestion would primarily be experienced during focused or geographic mass call events.

The possibility of congestion on the CCS7 network precipitated by a specific calling event has also raised concerns. While the possibility of this happening does exist, congestion of CCS7 is not currently the most common result of most mass calling events.

Simply stated though, the key concern with mass calling lies in its ability to saturate one or more network elements with ineffective calls at the compromise of all other traffic. In the case where a network surveillance system is designed to automatically control the event, the network operator needs to know the quantity of calls which the network processed and which ended up being unsuccessful due to either called party being busy or facilities, i.e. trunks, being saturated. This is why most development approaches in the past have focused on identifying CCS7 messages that are specifically indicative of congestion conditions, for example RELease messages, rather than strict adherence to a raw count of attempts. This consideration is of significance for events where calls are destined to a call centre, therefore providing higher successful attempt rates despite a high number of calls.

A need therefore exists for a system and method of providing automated mass calling detection using CCS7 signalling data parameters which can overcome the problems herein before mentioned.

SUMMARY OF THE INVENTION

It is therefore an object of the present invention to provide an automated mass calling detection method and system which is realized through the use of real-time CCS7 signalling data.

Another object of the present invention is to provide an automated mass calling detection method and system which makes use of terminating monitoring and a hybrid monitoring scheme.

Yet another object of the present invention is to provide an automated mass calling detection method and system wherein the selection of CCS7 data parameters for the detection of mass calling events will depend on the level of accuracy of detection as well as the intended use of the data.

Yet another object of the present invention is to provide an automated mass calling detection method and system wherein a raw count of Initial Address Messages (IAMs) provides detection of mass calling events based on the order of magnitude of call flow towards a specific Directory Number.

Yet another object of the present invention is to provide an automated mass calling detection method and system wherein a higher level of detection accuracy can be provided. This is achieved by correlating, in the case of unsuccessful calls and by using common key parameters, RELease messages sent back from the terminating switch to the Initial Address Messages sent from an originating switch in order to identify a mass called DN.

In accordance with an embodiment of the present invention, there is provided, in a telephone network having a number of telephone switching offices which have CCS7 signalling capabilities and wherein each switching office is linked to STPs (Signalling Transfer Points), or other switching offices with CCS7 signalling links, a method of detecting mass calling events using CCS7 signalling data, comprising the steps of:

monitoring each signalling link connecting a switch;

identifying for each call, an Initial Address Message (IAM) sent from an originating switch to a terminating switch; and for a predetermined interval, maintaining a count of call attempts for each Directory Number DN to determine if there are an excessive number of call attempts to a determined (DN).

In accordance with another aspect of the present invention, there is provided in a telephone network having a number of telephone switching offices which have CCS7 signalling capabilities and wherein each switching office is linked to STPs (Signalling Transfer Points), or other switching offices with CCS7 signalling links, a method of detecting mass calling events using CCS7 signalling data, comprising the steps of:

monitoring each signalling link connecting a switch;

identifying for each call, an Initial Address Message sent from an originating switch to a terminating switch;

temporarily storing said IAM in storage means;

detecting the occurrence of a release message indicative of an unsuccessful call attempt;

identifying which of the stored IAMs corresponds to the release message; and computing a count for each directory (DN) having an IAM with a corresponding release message indicative of an unsuccessful call attempt such that mass calling events directed to a directory number can be detected.

BRIEF DESCRIPTION OF THE DRAWINGS

In order to impart full understanding of the manner in which this object and others are attained in accordance with the present invention, preferred embodiments thereof will be described hereinafter with reference to the accompanying drawings, wherein:

FIGS. 1a, 1b, 1c and 1d are flow diagrams illustrating generally the different types of mass calling events;

FIGS. 2a and 2b are flow diagrams illustrating the concept of message correlation according to the present invention;

FIG. 2c is illustrative of a table which can be used for message correlation according to the preferred embodiment of the invention.

In the following description and drawings, the same reference numerals will refer to the same structural elements.

DESCRIPTION OF THE PREFERRED EMBODIMENTS

Figure 1C:
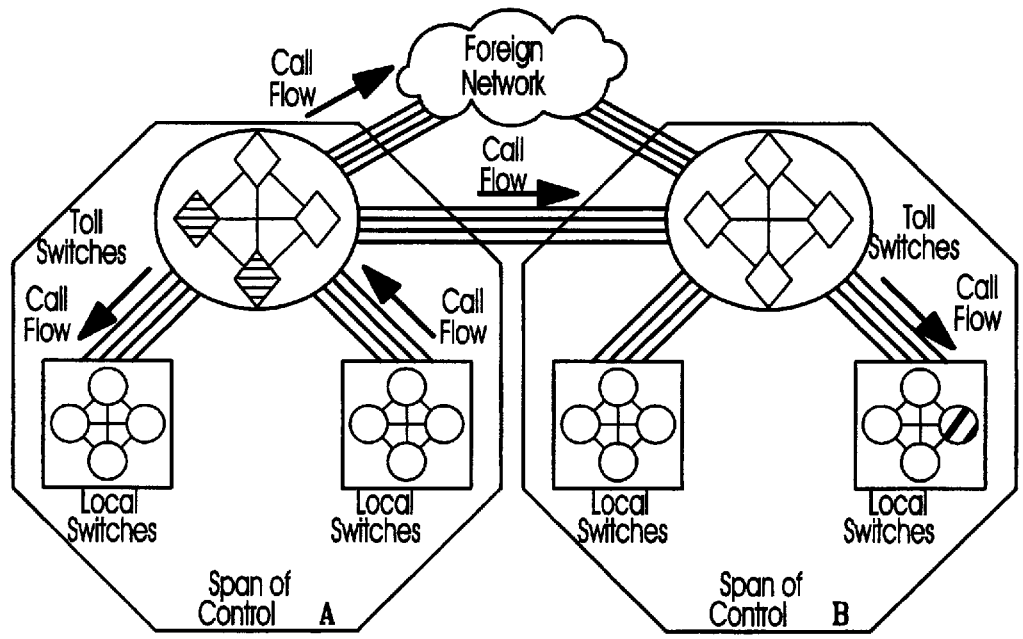

In order to lighten the following description, the following acronyms will be used:

AIN: Advanced Intelligent Network (conceptualized by Bell Communications Research Inc.);

CCS7: Common Channel Signalling 7 (also equivalently known as "SS7" (Signalling System 7));

CIC: Circuit Identification Code (CCS7 parameter);

CLID: Calling Line Identification (or CgPA: Calling Party Address, a CCS7 parameter);

CNA: Customer Number Address;

DN: Directory Number made up of a Network Planning Area Code, a Central Office Code and a Station Number;

DPC: Destination Point Code (CCS7 parameter);

DTMF: Dual Tone Multi-Frequency;

IAM: Initial Address Message (CCS7 ISUP message);

ISCP: AIN Database;

ISDN: Integrated Services Digital Network;

ISUP: ISDN User Part (CCS7 Protocol);

LATA: Local Access Transport Area;

LID: Link Interface Devices;

OPC: Originating Point Code (CCS7 parameter);

PSTN: Public Switched Telephone Network;

REL: Release Message (CCS7 ISUP message);

SCP: Signalling Control Point;

SP: Signalling Point;

SSP: Service Switching Point;

SS7: Signalling System 7;

STP: Signalling Transfer Point;

TCAP: Transaction Capabilities Application Part (CCS7 Protocol).

A typical CCS7 network consists of signalling links and nodes. CCS7 nodes are referred to as signalling points (SP) and are interconnected by signalling links. Each CCS7 signalling node is assigned a unique point code, serving as the network address for message routing. CCS7 signalling nodes include signalling points (SP), service switching points (SSP), service control points (SCP) and signal transfer points (STP).

Signalling points (SP) are capable of sending and receiving CCS7 messages with other CCS7-equipped telephone offices, and routing calls based on the information exchanged. Incoming messages are formatted and transferred to the relevant processing function in the switch. Outgoing messages are transmitted over the signalling links.

Service switching points (SSPs) are switches equipped to halt call progress, launch an CCS7 query to obtain additional network routing information from an SCP, and then route or treat the call based on the information received in the SCP's response. SSPs interact with databases to provide services and routing.

Service control points (SCP) are often referred to as CCS7 services databases. One or more SCPs can serve as a central intelligence point in the network for determining how and if calls are to be routed through the network. Queries and responses to and from the SCP are carried over CCS7 signalling links in the form of packet messages.

Signal Transfer Points (STP), are special CCS7 nodes which provide a message switching function between other nodes and a CCS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other CCS7 nodes, the STP does not generally act as a source or sink for SS7 messages (except for network management messages).

Referring now to FIG. 1a, we have shown a flow diagram illustrating mass calling events which can occur within a network or within a first span of control of a network manager. A span of control relates to the grouping of switches (and related geographical coverage) to which a network manager has access for control purposes.

For example, span of control A shown at reference numeral 10, may represent a geographical area combining switches operating in one or more area codes. A first cluster of switches 11 forming a LATA and a second cluster of switches 12 forming another LATA are connected via tandem or toll switches 13 forming part of an Inter Exchange Carrier (IEC).

Span of control B shown at reference numeral 15, represents a separate span of control managed by another network manager.

Mass calling events of Type I such as shown in FIG. 1a are characterized by the fact that the vast majority of offending calls both originate and terminate within the sub network of interest, and in the case of FIG. 1a, within span of control A. Toll switches 13 can become congested if calls directed to mass called switch 14 originate mostly from a remote area, i.e. cluster 12, even though located within the same span of control 10.

Referring now to FIG. 1b, we have shown a flow diagram illustrating mass calling events of Type II, i.e. caused by outside influence. In particular, in the illustration of FIG. 1b, the mass calling events pertain to a situation where a large number of offending calls destined to a target switch of interest, i.e. within a specific network manager's span of control, originate externally from the sub network of interest and thus for which the network manager does not have operational control. Thus, in this example, calls directed to mass called switch 24 originate from switches located in span of control B. These calls are sent via the toll switches of one or more Inter- Exchange Carriers 25. The calls can also originate from a foreign network 26. Traffic originating from span of control B can also create a potential congestion of the toll switches 23.

With reference to FIG. 1c, there is shown a flow diagram illustrating mass calling events of Type III, i.e. of outgoing events. In particular, in the scenario of FIG. 1c, a massive number of calls originating from the network manager's span of control A are directed to a target switch in span of control B located outside of the originating sub network. Mass calls of all types may cause congestion at gateway or toll switches depending on call patterns and routing arrangements.

Figure 1D:
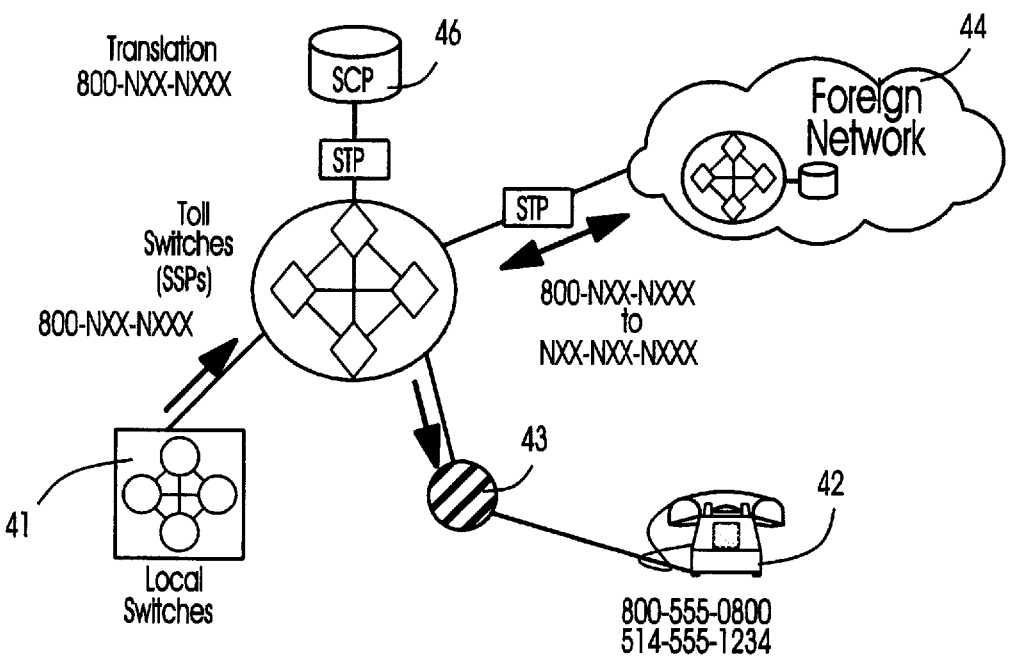

The call scenario of FIG. 1d can be used to describe a problem unique to number translation services, wherein irrespective of the source and target relationships, as with reference to FIGS. 1a, 1b and 1c, mass calling events may be experienced on a number translation-related service such as for toll free ("freephone") (800) or 900 calls, or any situation wherein a dialled number must be translated into a network routable number. This scenario causes special problems in the sense that detection and control can be substantially more challenging. For example, calls directed to a specific DN can originate from both the dialing of the 800 number or the corresponding DN itself.

In the case of 800 calls, a complexity arises because of the fact that the detected event is normally the translated network address (Directory Number) and that automatic controls can only be applied by obtaining the original dialled 800 number. The nature of 800 number services further complicates this operation, as numerous 800 to DN relationships may not always reflect a one to one correspondence. In some cases, due to the variety of 800 services, multiple 800 numbers may translate to one DN as well as a single 800 number may translate to multiple routable Directory Numbers. The problem is also amplified by the very nature of some events which may be caused by an 800 mass calling event is precipitated by service provided by a competing network or service provider. This would prevent the possibility of carrying out automatic reverse translation.

For example, in FIG. 1d, a call originating from local switches 41 and directed to station 42 of mass called switch 43, may have been initiated by dialing an 800 number, say 800-555-0800 or the routable Directory Number, say 514-555-1234. If the translation at SCP 46 is done for calls routed within the same network, then reverse translation of an 800 type call can be done.

In some cases, a specific dialled number will correspond to a service provided by a competing service provider. For example, in the case of 800-type calls serviced by a competing service provider in, say, network 44, the call will still originate from switches 41 but will be routed through switches of the competing network 44 for number translation. Say an 800 type call serviced by a competing network is made from one of the local switches 41. The toll switches (SSPs) will query SCP 46 for a translation of the dialled 800 type number to a routing number. Since the dialled 800 number is serviced by a competing service provider, the query will be forwarded to foreign network 44. The conversion to a DN will be carried out between network elements of the competing organization making reverse translation impossible for the network manager of switch 43 (or 42). The call will nevertheless terminate to switch 43.

It is generally understood that although related, both the operations of detecting, i.e. being able to define the onset, duration and abatement of a given event, and controlling, i.e. allowing X calls per unit time or one call per X calls initiated for any given event, are in fact quite distinct. Automatic detection using CCS7 and automated control present different challenges. This is mainly due to the need to accurately determine the right level of control throughout the network as well as the measure of success, all in a dynamic fashion. Associated with given design approaches are specific types of events which will be detected and controllable.

With the detection method and system of the present invention, the selection of CCS7 data packets for the detection of mass calling events will depend on the level of accuracy of detection required as well as the intended use of the data. If all that is required is automated detection, wherein there is no dynamic control, a raw count of Initial Address Messages (IAMs) will provide good information on the order of magnitude of call flow towards specific Directory Numbers (DNs). The initial address message (IAM) is the first ISDN user part (ISUP) message sent from an originating switch to the destination for the setup of a given call on the selected inter-office trunk.

Where dynamic control is intended, a more meaningful and accurate value must be extracted. This consists of determining the number of unsuccessful attempts which were directed toward a given Directory Number in previous intervals. This is required in order to avoid the application of controls which are too severe or not sufficient. Thus, in cases where it is desirable to have a higher level of accuracy, one must determine precisely the number of unsuccessful attempts made during any given interval. These attempts can be detected via the interpretation of specific CCS7 messages, more precisely Release Messages. The latter contain a variety of indicators which clearly identify the reason for which a given attempt did not result in the establishment of a call. For example, release message #17 is transmitted by the terminating switch and identifies that the user is busy. However, for the purpose of mass calling detection, release messages by themselves do not provide the necessary information. The parameters which allow for the correct identification of a given event can be found within the corresponding IAM which preceded the release message. Accordingly, key parameters must be used to establish the linkage between both Initial Address Messages and Release Messages. Some of the common key parameters which can be used are the Circuit Identification Codes (CIC) and signalling point codes which include Originating Point Code (OPC) and Destination Point Code (DPC).

Referring now to FIG. 2a, a flow diagram can be used to illustrate a call attempt from originating switch 60 to terminating or target switch 61.

Before a voice path can be established between the originating and the terminating switches on trunk 62, an exchange of signalling information (ISUP messages) between the switches must first be completed. In this example, exchange of signalling information is done via Signalling Transfer Points (STP) A or B. STPs are set up in pairs for redundancy purposes. Signalling information can also be done directly between the originating and the terminating switch. This link is shown in FIG. 2a and 2b as a dotted line.

Before the voice path is established on trunk 62, an IAM 63 is sent to the target switch 61 via STP A on link 1A and Link 2A. The IAM 63 will contain a number of codes, including the Called Party Number, common Circuit Identification Code and Originating Point Code.

In the call flow diagram of FIG. 2a, the detection and identification of unsuccessful attempts towards the target switch 61 would be carried out by first detecting the Release Message transmitted on the signalling link 2a (or 1a) and correlating it with the Initial Address Message on link 2a (or 1a) sent by the originating switch 60. If the detection is made at the originating switch 60, then correlation between the IAM and REL messages is done, in this example, on link 1a. If detection is made at the terminating switch 61, then correlation between the IAM and REL messages is done, in this example, on link 2a. Correlation is accomplished by making use of the common CIC and point codes. This correlation can easily be effected at either STP A or STP B through which the signalling data is routed.

However, since STPs are often used in pairs as redundant units, it is possible that an Initial Address Message be forwarded via one link whereas the RELease message can be forwarded via another link. This is because each switch is linked to STPs of a given pair via two diverse signalling link sets which may consist of multiple data links. Not only is message correlation important as explained previously, but linkage must also be carried out across distinct links as shown in FIG. 2b. In this example, the ISUP messages are the same as illustrated in FIG. 2a, except that the data packets follow different routes. The IAM 63 follows the same route on links 1a and 2a. However, the REL message 64 follows a different route. The RELease message 64 sent from the target switch 61 to originating switch 60 on link 2b (and 1b) must be correlated on link 2a (and 1a) with the Initial Address Message 63 transmitted to the target switch 61 on link 1a (and 2a). Again, the link on which correlation is made will depend on whether the terminating or the originating switch is monitored. Thus, message correlation across diverse signalling links has to be considered.

In addition, monitoring can be done at the originating switch,. terminating switch or a combination of both. This will be explained in further details with reference to FIGS. 3a, 3b and 3c.

The table of FIG. 2c can be used to provide message correlation between an Initial Address Message (IAM) sent by the originating switch and a RELease message sent by a terminating switch.

The table can be implemented in a cyclical buffer to store each incoming message. In the case of the Initial Address Messages, the Called Party Number or DN, the Circuit Identification Code (CIC) and Originating Point Code (OPC) are stored in the buffer. With a RELease message, the Destination Point Code (DPC) and the CIC are stored in the buffer.

When a RELease message indicative of an unsuccessful attempt is stored in the buffer, a correlation is made with existing IAM. If a match is made between the CIC of the IAM and the CIC of the REL messages, and between the DPC and OPCs, then a count is tabulated to keep track of unsuccessful attempts at the identified called number or DN.

The count of unsuccessful attempts for the identified DN is monitored and can therefore be used to detect the real-time occurrence of mass calling events.

In the event that a call to a 800 or 900-type freephone directory number is made, a correlation of IAM and REL common key parameters will be made as before. However, depending on whether the ISUP messages are monitored before or after number translation, the IAM will include either the routable DN number or the dialled 800 or 900 number.

Using CCS7 signalling information, the method of the present invention can provide effective detection via a number of monitoring techniques. In particular, with reference to FIG. 3a, we have shown a flow diagram illustrating the monitoring of ISUP messages which relate to the establishment of a call to the terminating switch. In the present example, the detection algorithm focuses on the count of specific messages characterizing unsuccessful attempts for each target routable Directory Number, more specifically, the number of RELease messages sent back from the terminating switch. As indicated previously, this approach requires that message correlation be carried out between RELease messages of interest and their corresponding Initial Address Messages in a cyclical buffer, for example, as shown in FIG. 2c.

Figure 3A:
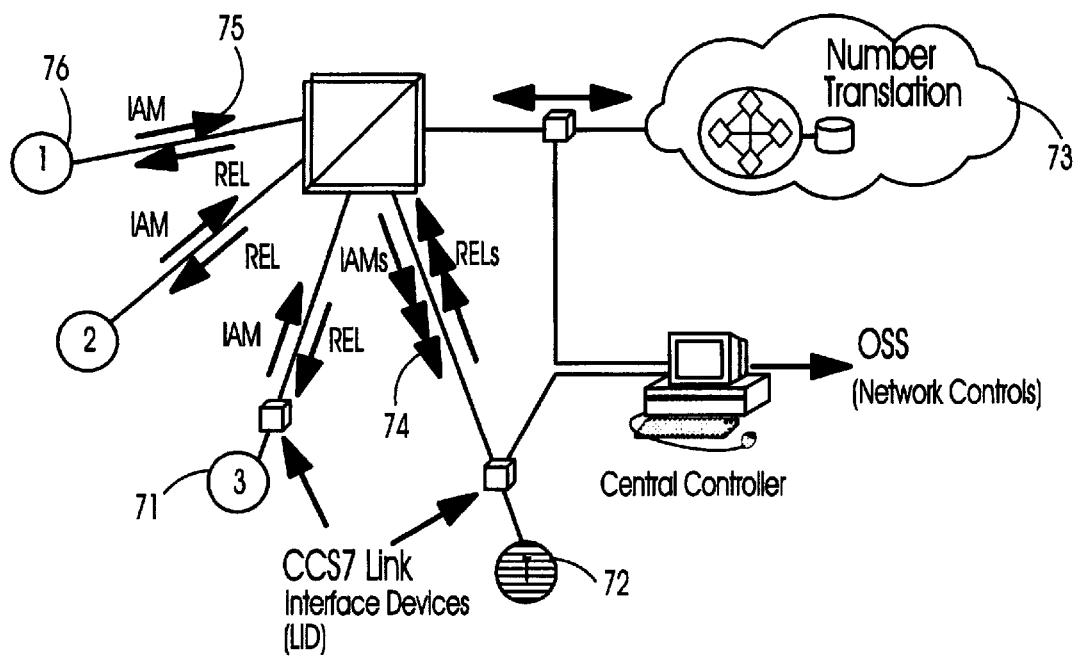
FIGS. 3a, 3b and 3c are flow diagrams illustrating the mass calling detection according to the embodiments of the present invention.

In FIG. 3a, monitoring devices are placed at terminating switches 71 and 72 determined to be the most likely to be affected by mass calling events. In FIG. 3a, switch 72 is shown as being a mass called switch. The monitoring devices can consist of CCS7 Link Interface Devices (LID), which are known to those knowledgeable to this art.

Although the embodiment of FIG. 3a can provide real-time detection of mass calling events, terminating monitoring by itself does not solve the problem associated to mass calling events which made use of number translation databases; such as shown at reference numeral 73. IAM 74 directed to mass called switch 72 will carry a translated Called Party Number, as opposed to, say, a 800 or 900-type number which might have been sent on IAM 75. In the case where switch 76 has SSP functionalities, meaning it has the capability to interrogate a database for number translation (to a routable number), IAM 75 will reflect the same called number as IAM 74 (ISUP messaging carried out after number translation at the origin).

In the case where switch 76 does not have SSP functionality, and that a tandem switch needs to be accessed to perform a number translation, IAM 75 then reflects different Called Party Number information than IAM 74. Reverse number translation can therefore be achieved by monitoring SS7 links which transport these types of database transactions. Reverse translation is simply carried out by intercepting and correlating a database TCAP response (with the routing number corresponding to the mass called DN) with a TCAP database query having the corresponding transaction ID and containing the original dialled number.

Figure 3B:
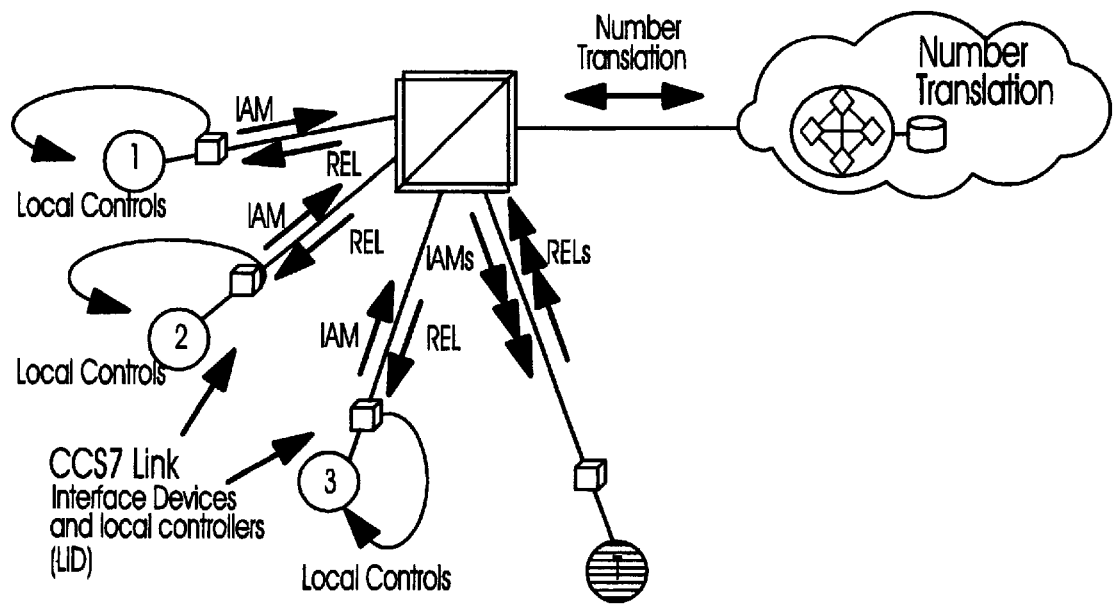

In the implementation of FIG. 3b, ISUP messages which relate to the establishment of a call from originating switches are monitored. Specifically, the detection algorithm establishes statistics for measured intervals for all outgoing (dialled) numbers. These statistics are used for the purpose of determining whether or not flow controls should be locally applied on calls to a dialled number for which completion rates proved to be below acceptable levels in the past.

This approach is further characterized by on-site control of call flow to a given dialled number based on locally gathered statistics. Based on preceding detection intervals, the control algorithm operates on the principle that the flow of calls should locally be diminished until a higher completion rate is measured.

Figure 3C:
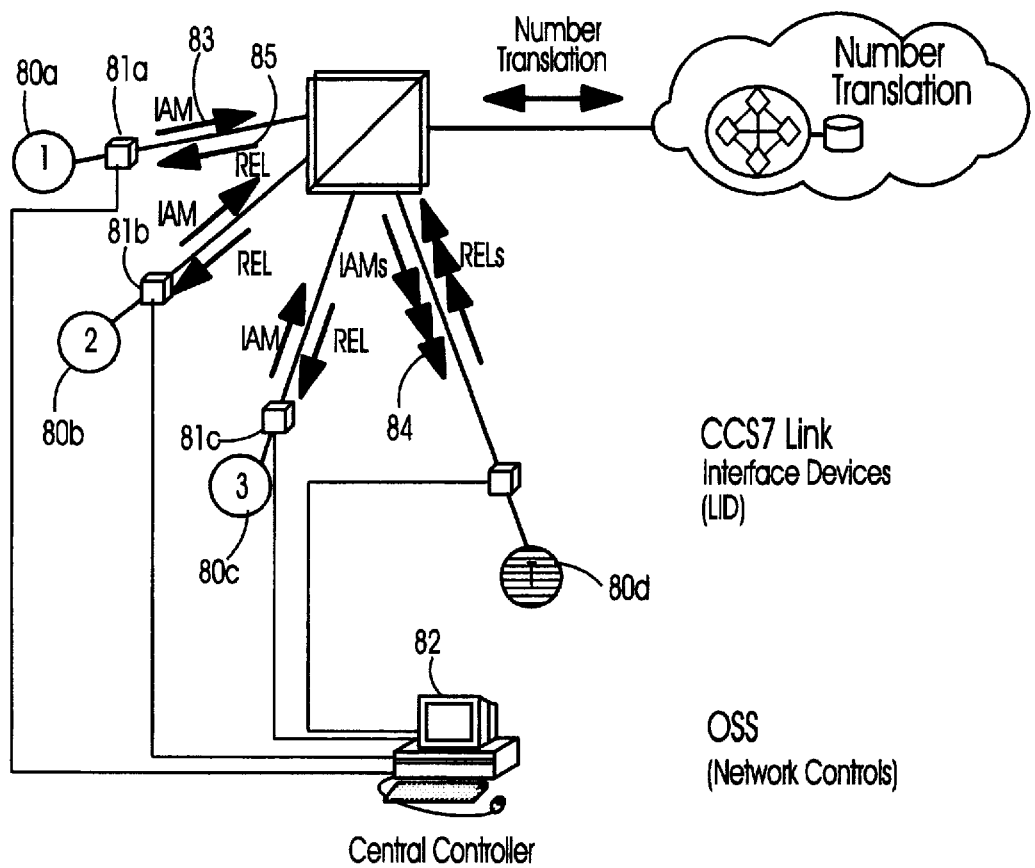

FIG. 3c illustrates the use of a hybrid monitoring approach which basically consists of using a combination of both the originating and terminating approaches. In this approach called Centralized Originating Monitoring, the focus is placed on the identification of unsuccessful attempts generated by individual switches, i.e. Initial Address Messages transmitted and RELease messages received. However, as opposed to using the raw data obtained on a local basis, statistical significance can be increased by carrying out, on an interval basis, a concatenation of all identified unsuccessful attempts on a network-wide basis.

For example, each switch 80a, b, c and d is monitored using separate Link Interface Devices (LID) 81a, b, c and d respectively. The LIDs are all connected to a central controller 82 which collects data related to unsuccessful attempts.

The implementation of the Centralized Originating Monitoring system covering originating local switches, alleviates the problems described with 800 and other number translation services such as shown in FIG. 1d. The approach addresses both Types I and III events while remaining unaffected by the evolution of number translation services, including those introduced through AIN-based services.

Thus, in FIG. 3c, correlation of IAM 83 containing, say, an 800-type number, with RELease messages 85 can be accomplished with the information on unsuccessful calls consolidated by central controller 82. This occurs since each correlated message will have, as explained earlier, common key parameters, as shown in the correlation table of FIG. 2c. The count for each correlated message provides the operator with real time information to detect mass calling events directed to switch 80d. This information can then be supplied to the network managers to provide network controls for each dialled number, i.e. 800 or 900-type or direct-dialed 7-digit numbers, which cause the mass call events.

Although the present invention has been explained herein above by way of preferred embodiments thereof, it should be pointed that any modifications to these preferred embodiments within the scope of the appended claims, are not deemed to change or alter the nature and scope of the present invention.

I claim:

1. In a telephone network having a number of telephone switching offices which have CCS7 signalling capabilities and wherein each switching office is linked to STPs (Signalling Transfer Points), or other switching offices with CCS7 signalling links, a method of detecting mass calling events using CCS7 signalling data, comprising:

monitoring each signalling link connected to a switch;

identifying for each call attempt, an Initial Address Message (IAM) sent from an originating switch for the call attempt to a terminating switch;

determining the Directory Number (DN) dialled by examining the dialled number in the IAM; and for a predetermined time interval, maintaining a count of call attempts for each to determine an order of magnitude of call flow towards specific DNs in order to detect an excessive number of call attempts to a specific and alerting network administration when an excessive number of call attempts to a specific DN is detected.

2. In a telephone network having a number of telephone switching offices which have CCS7 signalling capabilities and wherein each switching office is linked to STPs (Signalling Transfer Points), or other switching offices with CCS7 signalling links, a method of detecting mass calling events using CCS7 signalling data, comprising the steps of:

monitoring each signalling link connecting a switch;

identifying for each call, an Initial Address Message sent from an originating switch to a terminating switch;

temporarily storing said IAM in storage means;

detecting the occurrence of a release message indicative of an unsuccessful call attempt;

identifying which of the stored IAMs corresponds to the release message; and computing a count for each directory (DN) having an IAM with a corresponding release message indicative of an unsuccessful call attempt such that mass calling events directed to a directory number can be detected.

3. A method as defined in claim 2, wherein a release message sent from the terminating switch is correlated to correspond to an initial address message sent from the originating switch, by comparing key parameters common to both the Release Message and the Initial Address Message.

4. A method as defined in claim 3 wherein said key parameters comprise a common Circuit Identification Code (CIC) and signalling point codes.

5. A method as defined in claim 3, wherein each Release Message and Initial Address Message are monitored using CCS7 links to switches, such that the Initial Address Message and Release Messages can be correlated when each message is transmitted on diverse signalling links.

6. A method as defined in claim 5, wherein signalling links are monitored at the originating switch.

7. A method as defined in claim 5, wherein said signalling links are monitored at the terminating switch.

8. A method as defined in claim 5, wherein said signalling links are monitored at each switch to detect unsuccessful call attempts generated by each individual switch.

9. A method as defined in claim 8, wherein monitoring devices on each link are connected to a central controller to consolidate on a network-wide basis, counts of unsuccessful attempts per dialled number, and to detect mass calling events caused by the dialing of translated and non-translated numbers.

10. A method as defined in claim 7, wherein said links are monitored for CCS7 messages carrying database queries and responses to enable reverse translations of a translated routable Directory Number to an originally dialled number sent from the originating switch.

11. A method as defined in claim 10, wherein said reverse translation can be enabled by intercepting and correlating a database response containing a routing number corresponding to a mass called Directory Number, with a database query having a corresponding transaction ID and containing said originally dialled number.

12. A method as defined in claim 1, wherein said signalling links between said originating switch and said terminating switch are routed via STPs (Signalling Transfer Points).

13. A method as defined in claim 12, wherein each signalling link is monitored at the STPs.

14. A method as defined in claim 2, wherein said signalling links between said originating switch and said terminating switch are routed via STPs (Signalling Transfer Points).

15. A method as defined in claim 14, wherein each signalling link is monitored at the STPs.

16. A method as defined in claim 1, wherein direct signalling links are provided between the originating and the terminating switches.

17. A method as defined in claim 2, wherein direct signalling links are provided between the originating and the terminating switches.

* * * * *